United States Patent Office 3,477,789
Patented Nov. 11, 1969

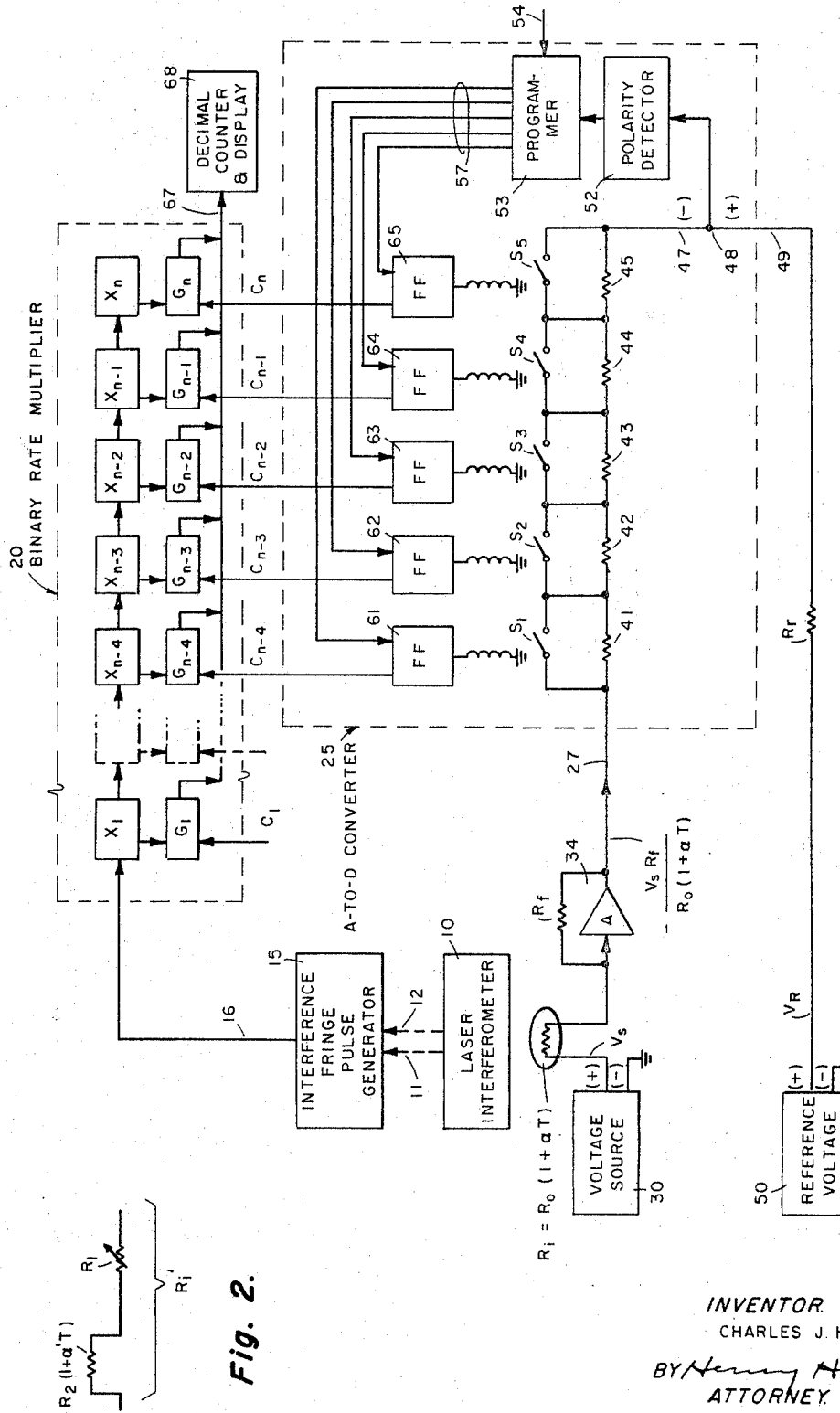

3,477,789
TEMPERATURE-COMPENSATED GAUGING LASER INTERFEROMETER SYSTEM
Charles J. Hubbard, Huntington, N.Y., assignor to Cutler-Hammer, Inc., Milwaukee, Wis., a corporation of Delaware
Filed Nov. 24, 1967, Ser. No. 685,559
Int. Cl. G01b 9/02
U.S. Cl. 356—106                              7 Claims

ABSTRACT OF THE DISCLOSURE

A direct-reading distance-measuring, or gauging, laser interferometer system having converter means responsive to a temperature-dependent analog voltage to automatically correct the distance read-out to account for the nonlinear change in wavelengh of the laser light that results from the change in temperature of the air in the light propagating path. The analog voltage is produced by temperature-dependent means which causes the voltage amplitude to change proportionally to the nonlinear change in wavelength of the laser light.

BACKGROUND OF THE INVENTION

It is common practice to compensate automatic measurement and control systems to account for changes that occur, or fail to occur, as the case may be, because of the variation in some environmental parameter such as temperature. If the system change, or the change that should occur but does not, is a linear function of temperature change, the compensation problem is relatively simple. Quite often, however, the change that is desired is a more complex function of temperature change, and this requires complex and expensive apparatus to achieve the compensation. In such cases it is common practice to first produce a voltage whose magnitude varies linearly with a change in temperature. The temperature-dependent voltage then is coupled as the input voltage to a closed-loop servo control system whose output is a mechanical shaft having an angular position that is directly related to the magnitude of the input temperature-dependent voltage. Coupled to this mechanical shaft is a potentiometer which has a special nonlinear resistance element which has been manufactured so that its output voltage varies with rotation of the shaft according to the complex function that relates the system functioning to the temperature change. This voltage then is used to effect the desired change, or to correct for the undesired change.

SUMMARY OF THE INVENTION

In accordance with the present invention, a resistance element is positioned adjacent the laser beam of a distance-measuring, or gauging, laser interferometer so that the resistance element always will be at substantially the same temperature as the air through which the laser beam is propagating. The element has a value of resistance substantially equal to $R_0(1+\alpha T)$, where $R_0$ is its resistance value at zero temperature centigrade, $\alpha$ is the temperature coefficient of resistivity of the element, and $T$ is the temperature of the air in the light propagating path. The resistance element is series connected between a source of voltage $V_s$ and the input to a high gain operational amplifier having a resistive feedback connection. With this simple and inexpensive arrangement of apparatus, the output voltage of the operational amplifier varies according to the relationship $1/(1+\alpha T)$, which is the same type of relationship by which the wavelength of the laser light varies as the temperature of the air varies. By choosing a resistive element whose $\alpha$ is substantially equal to $3.661 \times 10^{-3}$ per degree centigrade, the nonlinear change in amplitude of the voltage $V_s$ due to temperature change will be directly proportional to the change in wavelength of the laser light. This temperature-dependent voltage is coupled to an analog-to-digital converter which controls a given number of least significant bit positions of a pulse rate multiplier so as to change the ratio between a series of input pulses representing light interference fringes from the gauging interferometer and a series of output pulses that represents units of distance, thereby to compensate the distance measurement read-out for the change in wavelength of the laser light with a change in temperature.

BRIEF DESCRIPTION OF THE DRAWING

The invention will be described by referring to the accompanying drawings wherein:

FIG. 1 is a simplified illustration of the relevant portions of a gauging laser interferometer system; and FIG. 2 is a simplified illustration of an alternative arrangement of temperature-dependent resistive means that may be employed in the system illustrated in FIG. 1.

DESCRIPTION OF THE PREFERRED EMBODIMENT

The basic distance-measuring, or gauging, laser interferometer system first will be described. In FIG. 1, the laser interferometer 10 may be any of the types that are well known in the art which provide two light paths for respective beams, one path including a reflecting mirror that is mounted on a movable member whose distance from a fixed reference position is to be measured. The two beams 11 and 12 are incident on interference fringe pulse generator means 15 which includes photo detecting means that responds to the changing interference fringe patterns to supply an electrical pulse on line 16 each time the cyclically varying interference fringe pattern reaches an intensity maximum. I presently prefer to use a laser interferometer and interference fringe pulse generator means of the type illustrated in FIG. 1 of my U.S. patent application Ser. No. 405,494, filed Oct. 21, 1964, and entitled "Gauging Interferometer Systems." In that type of system, the beam path that includes the movable mirror is optically "folded," so that a quarter wavelength displacement of the movable mirror produces a cycle of variation of the fringe pattern intensity and thus causes one output pulse to be produced on line 16. A continuous displacement of the movable mirror of the gauging interferometer causes a continuous series of pulses to be produced on line 16. These pulses could be counted and a read-out display would indicate the displacement of the movable mirror in units of quarter wavelengths of the monochromatic laser light. This type of read-out is not convenient to the user of the equipment, so additional apparatus is included to convert the series of pulses on line 16 to a second series of pulses which represent displacement in more conventional units of linear measurement. In this example it will be assumed that the ultimate read-out is to be in units of ten-millionths of an inch, so a second pulse series is produced in which each pulse represents a displacement of one ten-millionths of an inch.

A binary rate multiplier 20 is employed to accomplish the desired conversion between the two pulse series. Binary rate multipliers commonly are employed for this purpose and their construction and operation are well known to those skilled in the art. For example, the text Handbook of Automation Computation and Control, vol. 2, edited by Grabbe, Ramo, and Wooldridge, published by John Wiley and Sons, Inc., New York, copyright 1959, describes this type of device on pages 29–05 et seq. The device consists of a series of cascaded binary scalers each having an associated gate. The first scaler produces an output pulse after two input pulses are applied thereto; the second scaler produces an output after two inputs are applied thereto from the first stage, and so on, so that one-half of the total number of input pulses will occur at the output of the first scaler, one-quarter at the output of the second scaler, one-eighth at the output of the third scaler, etc. The binary-weighted output of each scaler is applied to its associated gate which is open or closed according to the binary value of a correspondingly weighted digit of a binary-coded multiplier number. The binary-coded multiplier number is the conversion factor that relates the two series of pulses. The outputs of all open gates are combined to produce the desired second series of pulses. Assuming that the interferometer includes a helium-neon gas laser that emits light at the nominal wavelength of 6328 angstroms, setting the gates of the binary rate multiplier to represent a number whose decimal value is .622853793 will cause binary rate multiplier 20 to convert a series of pulses on line 16 to an output series of pulses wherein each pulse of the output series represents a displacement of one ten-millionth of an inch. This conversion factor is correct for the following reference conditions of the air in which the laser beam is propagating: 20° C. temperature, 760 millimeters of mercury atmospheric pressure, and 40 percent relative humidity.

In FIG. 1, the successive scaler stages of the binary rate multiplier are represented by block $X_1$ through $X_n$ and the blocks $G_1$ through $G_n$ represent their respective gates. In one embodiment of the invention that has been successfully operated, the binary rate multiplier 20 included twenty-one stages. The lower order stages of the binary rate multiplier are controlled by the higher order bits of the multiplier number and the higher order stages of the binary rate multiplier are controlled by the lower order bits of the multiplier number. Because the wavelength of the laser light varies as a function of the temperature of the air in the light propagating path, the number of pulses on line 16 that correspond to a given linear distance will vary as the temperature of the air varies. To compensate for this temperature dependent variation, the value of the multiplier number that controls the number of output pulses from the pulse rate multiplier may be made to vary with temperature in such a manner that the number of output pulses from pulse rate multiplier 20 is corrected to account for the wavelength change of the laser light. This may be done by causing the binary values in designated bit positions of the multi-bit multiplier number to change in accordance with temperature and allowing these designated bits to control the gates of a given number of the higher order stages of the binary rate multiplier.

In FIG. 1, the bits of the binary-coded multiplier number, i.e., the conversion factor, are coupled over the respective leads $C_1$ throuh $C_n$ to the gates $G_1$ through $G_n$ of the respective stages of the binary rate multiplier 20. The binary values of the bits of the conversion factor that are coupled to the lower order stages of the binary rate multiplier, i.e., $X_1$, $X_2$, etc., are fixed in value, but the lower order bits of the conversion factor which are coupled to the higher order stages $X_n$, $X_{n-1}$ . . . $X_{n-4}$ are changed in value by the analog-to-digital converter 25. An analog voltage whose amplitude varies according to the relationship $1/(1+\alpha T)$ is coupled on input line 27 to analog-to-digital converter 25. The relationship expressed immediately above, and whose terms are defined below, is the same type of relationship by which the wavelength of the laser light varies as a function of temperature of the air in the light path.

The temperature-dependent analog voltage on line 27 is produced in the following manner. A temperature-independent voltage source 30 provides a positive voltage $V_s$ which is coupled to a temperature-dependent resistance element $R_t$ that is positioned proximate the laser beam path so that it is in the same temperature environment as the air in the path. Resistant element $R_t$ has the resistance characteristic $R_0(1+\alpha T)$, where $R_0$ is its resistance value at zero temperature, $\alpha$ is its temperature coefficient of resistivity, and T is the ambient temperature in degrees centigrade.

Coupled to the output terminal of resistor $R_t$ is an operational amplifier 34 having the feedback resistor $R_f$ connected from the output to the input. The output voltage of operational amplifier 34 is directly proportional to the resistance of feedback resistor $R_f$ and inversely proportional to the resistance of input resistor $R_t$. Therefore, the voltage that is coupled to analog-to-digital converter 25 is expressed by the quantity $$-\frac{V_s R_f}{R_0(1+\alpha T)}$$

the minus sign being attributable to polarity inversion occurring in the amplifier.

From the text Modern Interferometer, by Chandler, published by Hilger & Watts Ltd., Hilger Division, Great Britain, copyright 1950, it is known that the change in wavelength of light propagating in air varies as a function of temperature according to the relationship $1/(1+\alpha T)$, where $\alpha$ is a constant having the value of approximately $3.661 \times 10^{-3}$ per degree centigrade, and T is the ambient temperature. Therefore, by choosing a resistance element $R_t$ whose temperature coefficient of resistivity $\alpha$ is substantially equal to $3.661 \times 10^{-3}$ per degree centigrade and whose resistance value changes substantially linearly with temperature, the analog voltage output of operational amplifier 34 will vary as a function of temperature in substantially the same manner as the wavelength of the laser light in the interferometer varies with the temperature of the air. I have successfully used a length of annealed, substantially pure platinum wire for the resistance element $R_t$. The temperature coefficient of resistivity ($\alpha$) of substantially pure platinum is approximately $3.7 \times 10^{-3}$ per degree centigrade, and the resistance change with temperature is quite linear. The length of platinum wire may be wound in stress-free manner on a coil form, and the coil form secured in a position adjacent the laser beam path.

The function served by operational amplifier 34 is not only that of a polarity inverter to provide the nonlinear inverse relationship to temperature change, but it also functions as a transducer to transduce the current output of resistance element $R_t$ to an input voltage for the analog-to-digital converter 25. Furthermore, after having provided circuit means such as the length of platinum wire which gives the approximate desired value of $\alpha$, the transducer must have a very low input impedance in order to avoid introducing another resistance which would have the equivalent effect of changing the value of the $\alpha$ term in the above expression that describes the signal constituting the input to analog-to-digital converter 25. Operational amplifier 34 ideally serves all of these functions.

Analog-to-digital converter 25 may be any one of a variety of types that are well known in the art. The converter illustrated in simplified form in FIG. 1 is the type that functions by the successive approximation method. Converters of this type are described on pages 20–63 of the above-cited text by Grabbe et al. The converter 25 includes a chain of resistors 41 through 45, each of which is shunted by the contacts of a respective switch $S_1$ through $S_5$. The resistance values of resistors 41–45 are binary weighted. That is, resistor 41 has twice the resistance value of resistor 42; resistor 42 has twice the resistance value of resistor 43; and so on along the chain.

The resistor chain 41–45 is connected by lead 47 to the junction 48, and lead 49 connects the reference voltage source 50 and resistor $R_r$ to the junction. Reference voltage source 50 provides a fixed reference voltage $V_r$ of positive polarity. Because operational amplifier 34 inverts its positive polarity input $V_s$, the voltages on leads 47 and 49 are negative and positive respectively. These two voltages combine at junction 48 and the polarity of the resultant voltage, if any, is sensed by polarity detector 52 which produces an appropriate output signal indicative of that polarity. This signal indicative of the polarity is coupled to programmer 53. External timing and sequence signals are coupled to programmer 53 over input cable 54. Programmer 53 has a plurality of output leads 57 that respectively are coupled to the flip flops 61–65 which normally are in their zero states. The control windings of relays $S_1$–$S_5$ are controlled by the flip flops and each winding is energized and closes its associated contact when its respective flip flop is in its one state. Flip flops 61–65 also control respective gates in the higher order stages of binary rate multiplier 20. When a flip flop is in its zero state and its relay is open, the associated gate of the pulse rate multiplier is open to allow pulses from that stage of the pulse rate multiplier 20 to couple to the output line 67.

Analog-to-digital converter 25 operates as follows. During a first timing interval, the polarity of the resultant voltage at junction 48 will be detected by polarity detector 52, and if the polarity is negative, a signal is coupled from programmer 53 to flip flop 61 to cause it to change to its one state, thus closing the contact of relay $S_1$ to shunt resistor 41, and closing the gate $G_{n-4}$ of binary rate multiplier 20. During the next immediately following timing interval, and with resistor 41 shunted out of the resistor chain, the polarity of the resultant voltage at junction 48 again is detected and if it again is negative, flip flop 61 is kept in its one state and flip flop 62 will receive a signal from programmer 53 which transfers it to its one state, thus closing the contacts of its relay $S_2$ to shunt resistor 42, and closing the associated gate $G_{n-3}$ of binary rate multiplier 20. If, however, the polarity of the resultant voltage at the junction 48 is determined to be positive instead of negative during the second timing interval, flip flop 61 is retransferred to its zero state by a signal from programmer 53, thus reinserting resistor 41 into the chain and reopening gate $G_{n-4}$, and flip flop 62 is transferred to its one state, which closes the contacts of relay $S_2$ to shunt resistor 42 and also closes gate $G_{n-3}$. The converter continues operating in this manner along the chain of flip flops and resistors, and because of the binary weighting of the resistors 41–45, successive approximations are made until the resultant voltage at the junction 48 is zero and the gates $G_n$–$G_{n-4}$ are set to indicate the temperature-corrected conversion factor.

With the temperature-corrected conversion factor now set into the gates of the binary rate multiplier 20, the output pulses on line 67 represent the displacement of the movable mirror of the interferometer in units of ten millionths of an inch. The pulses on line 67 are counted in a decimal counter 68 which also provides a direct visual readout, or display, of the distance measured.

It may be seen that the setting of the higher order gates $G_{n-4}$ through $G_n$ of the binary rate multiplier 20 is dependent upon the amplitude of the analog voltage on lead 27, and the amplitude of this voltage is a function of the temperature environment of resistor $R_1$. Although only five stages of the pulse rate multiplier are illustrated as being controlled by analog-to-digital converter 25, in practice, ten stages of a twenty-one stage pulse rate multiplier were controlled in this manner. Substantially the same type of operation of the analog-to-digital converter may be achieved by using A.C. instead of D.C. voltages by sampling the respective A.C. voltages for a short interval each cycle and comparing the polarities of the samples of the two voltages.

Platinum wire is ideally suited for use as the temperature-dependent resistance element $R_1$ because its resistance change as a function of temperature is extremely linear and its $\alpha$ value very nearly matches that in the formula that relates the change in wavelength of light to the change in wavelength of light to the change in temperature of air. However, with suitable simple modifications other resistance materials that have higher values of $\alpha$ might be used, provided that their resistance changes with temperature still are linear. For example, in the arrangement of resistors $R_1$ and $R_2$ illustrated in FIG. 2, resistor $R_1$ is an adjustable resistor whose resistance value does not change as a function of the temperature of air in the light propagating path, and the resistance element $R_2(1+\alpha'T)$ is a temperature-dependent resistance element whose temperature coefficient of resistivity $\alpha'$ is quite linear, but larger than desired for the present purpose. The total resistance value $R_1'$ of the combination $R_1$ and $R_2(1+\alpha'T)$ may be expressed as follows:

$$R_1' = (R_1 + R_2)\left(1 + \frac{R_2 \alpha'}{R_1 + R_2} T\right)$$

On the right side of the above equation the expression within the first set of brackets is a constant, as is the denominator of the second term within the second set of brackets. The expression that expresses the resistance value of the temperature-dependent resistance element $R_1$ in FIG. 1. Therefore, with the resistance element $R_2(1+\alpha'T)$ placed proximate the laser light path, the resistance value of resistor $R_1$ can be adjusted to produce the effective value of temperature coefficient of resistivity that is required. It will be appreciated that the value of resistor $R_1$ may be made up of a combination of a separate resistor and the input resistance of the analog-to-digital converter 25, or possibly solely by the latter.

It may be seen that the above-described gauging interferometer system is extremely accurate and self-correcting for changes in the wavelength of the laser light due to changes in temperature of the air propagating path. The apparatus for producing the correction is quite simple because of the use of the temperature-dependent resistance element $R_1$ and operational amplifier 34 which directly produce the analog voltage amplitude variation that is required to produce the necessary correction. It is evident that this arrangement is simpler and less expensive than a closed loop servo system that drives a potentiometer having a specially produced resistance element.

What is claimed is:

1. In a gauging interferometer system that produces a first series of pulses in which each pulse represents a displacent measured in units of a fractional wavelength of light that propagates in a path in the interferometer and converts said first series to a second series of pulses in which each pulse represents said displacement in different units of measurement, the wavelength of said light changing according to a nonlinear inverse function of the change in temperature of the light propagating medium in said path, and wherein the conversion between the two series of pulses is performed by apparatus that includes a multistage pulse rate multiplier having a given number of higher order stages controlled by analog-to-digital converter means operating in response to an analog voltage, the improvement that changes the amplitude of the analog voltage according to a nonlinear inverse function of the change in temperature of the light propagating medium, thereby to effect changes in the ratio of pulses in said two series in proportion to the temperature-produced changes in the wavelength of the light, said improvement comprising, temperature-dependent resistance means positioned adjacent said light propagating path in substantially the same temperature-environment as said light propagating medium and electrically connected to receive an analog voltage, said resistance means comprising an element whose resistance value changes linearly with the change in temperature of said medium, said resistance means also having an effective value of temperature coefficient of resistivity approximately equal to $3.661 \times 10^{-3}$ per degree centigrade, and means for coupling said resistance means to the analog-to-digital converter means to provide to said converter means an input signal whose magnitude varies as a nonlinear inverse function of the temperature of said medium.

2. The combination claimed in claim 1 wherein said last-named means is a current responsive means responsive to an output current from said resistance means to provide to the analog-to-digital converter means a signal proportional to said current.

3. The invention claimed in claim 2 wherein the means for coupling said resistance means to the analog-to-digital converter means is an operational amplifier having a temperature-independent resistive feedback between its output and input.

4. The invention claimed in claim 2 wherein said resistance element is a length of substantially pure platinum wire mounted on support means in a substantially stress-free manner.

5. The invention claimed in claim 2 wherein said resistance means includes a temperature-dependent resistance element whose temperature coefficient of resistivity $\alpha'$ is greater than $3.661 \times 10^{-3}$ per degree centigrade and a second resistance element series connected to said temperature-dependent element, the resistance values of the temperature-dependent element ($R_2$) and the second resistance element ($R_1$) at zero degrees centigrade being proportioned so that the relationship $$\frac{R_2 \alpha'}{R_1 + R_2}$$

is approximately equal to $3.661 \times 10^{-3}$.

6. In a gauging laser interferometer system which produces a first series of pulses, each of which represents a fractional wavelength of a given laser light propagating in an air path in the interferometer and converts them to a second series of pulses in which each pulse represents a change in distance in units of linear measurement, wherein the wavelength of said light is a function of the temperature of the air in said path, and wherein the conversion between the two pulse series is performed by apparatus that includes a multistage pulse rate multiplier having a given number of higher order stages whose operations are controlled by analog-to-digital converter means, the improvement that changes the amplitude of an analog voltage input to said analog-to-digital converter means as a nonlinear inverse function of the change in temperature of air in said path, thereby to effect a change in the ratio of pulses in said two series in proportion to the temperature-produced change in wavelength of the laser light, said improvement comprising temperature-dependent resistance means positioned proximate said path in substantially the same temperature environment as the air in the path and coupled to receive a temperature-independent voltage, said resistance means having a resistance value $R_0(1+\alpha T)$ which increases substantially linearly with temperature, where $R_0$ is the resistance at zero temperature, $\alpha$ is approximately equal to $3.661 \times 10^{-3}$ per degree centigrade, and T is the ambient temperature, high gain amplifier means coupled to the output of said resistance means, resistance feedback means coupled between the output and input of said amplifier means, whereby the output of the amplifier means is an analog voltage whose amplitude varies with the temperature of the air in the light path according to an expression that includes the term $$\frac{1}{1+\alpha T}$$

and means for coupling said analog voltage as the input signal to said analog-to-digital converter means.

7. In a gauging laser interferometer system which produces a first series of pulses, each of which represents a fractional wavelength of a given laser light propagating in an air path in the interferometer and converts them to a second series of pulses in which each pulse represents a change in distance in units of linear measurement, wherein the wavelength of said light is a function of the temperature of the air in said path, and wherein the conversion between the two pulse series is performed by apparatus that includes a multi-stage pulse rate multiplier having a given number of higher order stages whose operations are controlled by analog-to-digital converter means, the improvement that changes the amplitude of an analog voltage input to said analog-to-digital converter means as a nonlinear inverse function of the change in temperature of air in said path, thereby to effect a change in the ratio of pulses in said two series as a function of said temperature, said improvement comprising a plurality of series connected resistance elements coupled to receive a temperature-independent voltage.

one of said resistance elements having a resistance value $R_2(1+\alpha'T)$, where $R_2$ is the resistance at zero temperature, $\alpha'$ is the temperature coefficient of resistivity which has a value greater than $3.661 \times 10^{-3}$ per degree centigrade, and T is the temperature of the air in said path, the remainder of the resistance elements having a resistance value $R_1$, said resistance values $R_1$ and $R_2$ being proportioned so that the relationship $$\frac{R_2 \alpha'}{R_1 + R_2}$$

has a numerical value approximately equal to $3.661 \times 10^{-3}$, operational amplifier means coupled to receive the output current of said series connected resistance elements for providing a signal whose amplitude varies proportionately to its input current, and means for coupling said signal as the input signal to said analog-to-converter means.

References Cited

"Three Interferometer Systems for Precision Measurements," an article in Laser Focus, Jan. 1, 1966, pp. 12–19.

JEWELL H. PEDERSEN, Primary Examiner

T. MAJOR, Assistant Examiner